Patented Dec. 31, 1940

2,226,628

UNITED STATES PATENT OFFICE 2,226,628

ORGANIC KETO ALCOHOLS AND METHOD OF OBTAINING THE SAME

Russell Earl Marker, State College, Pa., assignor to Parke, Davis & Company, Detroit, Mich., a corporation of Michigan No Drawing. Application November 4, 1937, Serial No. 172,852

6 Claims. (Cl. 260—397)

The invention relates to new pregnanolone compounds and their derivatives and methods of obtaining the same. More specifically, the invention is concerned with the preparation of pregnanolone compounds wherein an alcoholic hydroxyl group or its equivalent is attached to the $C_{20}$ atom and a ketonic oxygen atom or its equivalent is attached to the $C_3$ atom of a pregnane compound.

The compounds of the invention may be represented by the general formula,

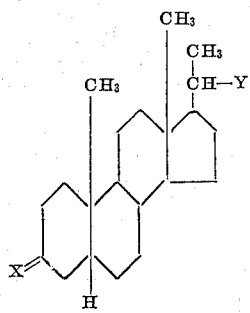

where X represents a ketonic oxygen atom or equivalent hydrolyzable group capable of yielding a ketonic oxygen atom, and Y is a hydroxyl radical or equivalent hydrolyzable group capable of yielding a hydroxyl group and in which the $C_5$ hydrogen atom and Y are present in the cis-steric arrangement. Thus, the parent compounds of the invention may be represented by the following formulas,

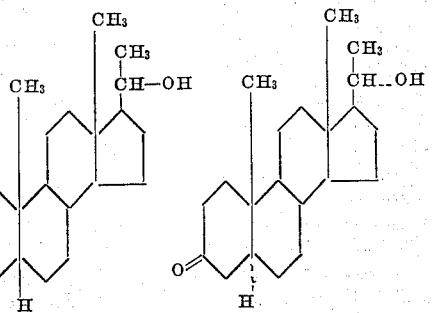

Pregnanol-20β-one-3    allo-pregnanol-20α-one-3

The invention may be carried out by starting with a pregnandiol, such as that obtainable from human pregnancy urine, converting the diol to a hydrolyzable derivative wherein the hydroxyl groups are protected against oxidation, such as by formation of a di-ester derivative, partially saponifying the protected derivative to one in which the protecting group at $C_3$ only has been removed to regenerate the alcoholic hydroxyl radical, and oxidizing the latter compound to convert the secondary alcohol group at $C_3$ into a ketonic oxygen atom with production of a $C_{20}$-protected derivative of a pregnanol-20-one-3-compound. If desired, the resulting 3-keto compound can be hydrolyzed to produce the corresponding pregnanol-20-one-3 compound, which can be further converted into other hydrolyzable derivatives coming under the general formula given above.

The following examples are illustrative of the invention.

Example 1.—*Preparation of pregnanol-20-β-one-3 and its derivatives*

Ten grams of the diacetate of pregnandiol-3β,20β, prepared as described in copending application of Russell Earl Marker, Serial No. 157,774, is dissolved in 3100 cc. of methyl alcohol. 0.8 mole of potassium hydroxide dissolved in about 200 cc. of methyl alcohol and about 15 cc. of water is added, the mixture shaken vigorously and allowed to stand at 20° C. for a period of 40 hours. The reaction mixture is then made neutral to litmus with dilute sulfuric acid and concentrated to 200 cc. on a steam bath. The hydrolyzed product is precipitated by slowly adding 2 liters of water. The suspension produced by adding water is filtered with suction, washed with water and dried. The pregnandiol-3β,20β-monoacetate-20 thus obtained in solid form is oxidized by dissolving it in 250 cc. of acetic acid, cooling to 20° C. and adding a solution of 1.5 gram of chromic oxide in 50 cc. of 90% acetic acid. The reactants are then maintained at a temperature of 20° C. for 18 hours, the reaction mixture diluted with 2 liters of water, and the oxidation products extracted with 750 cc. of ether. The ethereal solution is washed with dilute sodium carbonate solution, then with water, and finally evaporated to dryness. The residue thus obtained is pregnanol-20β-one-3-acetate. It can be further purified by the following procedure. The residue from evaporating off the ether is dissolved in 100 cc. of absolute ethyl alcohol and refluxed on a steam bath. Ten grams of Girard's reagent, for example trimethylaminoacetohydrazide hydrochloride, is added and the solution refluxed for 15 minutes, poured into 200 cc. of water and the non-ketonic material removed by extracting the aqueous solution with ether. The aqueous solution is acidified with 50 cc. of concentrated hydrochloric acid and heated for a half hour on a steam bath. The solution is then cooled and the precipitated ketone product is extracted with ether. The ether solution is washed with water and evaporated to dryness. The combined product from five such runs is further purified by dissolving it in 300 cc. of ethyl alcohol and refluxing this solution with 15 grams of potassium hydroxide. The refluxed solution is poured into a liter of water and the ketone product is extracted with 500 cc. of ether. The ether solution, after washing with water, is evaporated to dryness. 50 cc. of benzene is added to the ketone residue and the mixture distilled to remove traces of water. 30 cc. of dry pyridine and 20 grams of succinic anhydride are added and the mixture is heated on a steam bath for an hour. The solution containing the succinic acid monoester is poured into 500 cc. of water and then 500 cc. of ether is added. The pyridine is removed by shaking the mixture with dilute hydrochloric acid. The ether layer is separated, washed with water and then extracted twice with 100 cc. of saturated sodium carbonate solution. The alkaline aqueous extract is acidified with hydrochloric acid and then extracted with ether. The ether is evaporated off and the residue is hydrolyzed with potassium hydroxide solution. The hydrolyzed solution is extracted with ether, the ether evaporated from the ether extract and the pregnanol-$20\beta$-one-3 thereby obtained is dissolved up and crystallized from dilute methyl alcohol to give pure pregnanol-$20\beta$-one-3 melting at 172° C.

Anal. calcd. for $C_{21}H_{34}O_2$: C, 79.2; H, 10.8. Found: C, 79.5; H, 11.1.

Pregnanol-$20\beta$-one-3 reacts with semicarbazide to form a semicarbazone which can be separated by the usual methods. The semicarbazone melts with decomposition at 245° C.

Anal. calcd. for $C_{22}H_{37}N_3O_2$: C, 70.3; H, 9.9. Found: C, 70.0; H, 10.1.

Pregnanol-$20\beta$-one-3 can be converted by the ordinary methods of making derivatives of alcohols into its chloride, bromide, or other hydrolyzable derivative of pregnanol-$20\beta$-one-3, where the $C_{20}$-hydroxyl is replaced by a group capable of hydrolysis to again give a hydroxyl radical. Instead of, or in addition to, making derivatives where the hydroxyl group is replaced by a hydrolyzable group, derivatives can also be made in which the ketonic oxygen atom is replaced by a hydrolyzable grouping. For example, by using the known methods there can be made the above described semicarbazone, dihalides, such as the dichloride where the ketonic oxygen is replaced by two chlorine atoms, oximes, hydrazones, such as phenylhydrazone, various semicarbazones, bisulfite derivatives, etc.

EXAMPLE 2.—*Preparation of allo-pregnanol-$20\alpha$-one-3 and its derivatives*

Ten grams of allo-pregnandiol diacetate-$3\alpha$, $20\alpha$ is dissolved in about 3 liters of methyl alcohol. The solution is cooled to 20° C. and a solution of 1.13 grams of potassium hydroxide in 190 cc. of methyl alcohol and 15 cc. of water is added. The solution is shaken vigorously and allowed to stand at 20° C. for 48 hours and then at 30° C. for 12 hours. The reaction mixture is made neutral to litmus with dilute sulfuric acid and then concentrated to 200 cc. on a steam bath. The hydrolyzed product is precipitated by slowly adding 2 liters of water. The suspension produced by adding water is filtered off with suction, washed with water and dried. The allo-pregnandiol-$3\alpha,20\alpha$-monoacetate-20 thus obtained in solid form is oxidized by dissolving it in 250 cc. of acetic acid, cooling to 20° C. and adding a solution of 1.5 grams of chromic oxide in 50 cc. of 90% acetic acid. The reactants are then maintained at a temperature of 20° C. for 18 hours, the reaction mixture diluted with 2 liters of water, and the oxidation products extracted with 750 cc. of ether. The ethereal solution is washed with dilute sodium carbonate solution, then with water, and finally evaporated to dryness. The residue thus obtained is allo-pregnanol-$20\alpha$-one-3-acetate. It can be further purified by the following procedure. The residue from evaporating off the ether is dissolved in 100 cc. of absolute ethyl alcohol and refluxed on a steam bath. Ten grams of Girard's reagent, for example trimethylaminoacetohydrazide hydrochloride, is added and the solution refluxed for 15 minutes, poured into 200 cc. of water, and the non-ketonic material removed by extracting the aqueous solution with ether. The aqueous solution is acidified with 50 cc. of concentrated hydrochloric acid and heated for a half hour on a steam bath. The solution is then cooled and the precipitated ketone product is extracted with ether. The ether solution is washed with water and evaporated to dryness. The combined product from five such runs is further treated by dissolving it in 300 cc. of ethyl alcohol and refluxing this solution with 15 grams of potassium hydroxide. The refluxed solution is poured into a liter of water and the ketone product is extracted with 500 cc. of ether. The ether solution, after washing with water, is evaporated to dryness and the solid product remaining is allo-pregnanol-$20\alpha$-one-3. 50 cc. of benzene is added to this ketone product and the mixture distilled to remove traces of water. 30 cc. of dry pyridine and 20 grams of succinic anhydride are added and the mixture is heated on a steam bath for an hour. The solution containing the succinic acid monoester is poured into 500 cc. of water and then 500 cc. of ether is added. The pyridine is removed by shaking the mixture with dilute hydrochloric acid. The ether layer is separated, washed with water and then extracted twice with 100 cc. of saturated sodium carbonate solution. The alkaline aqueous extract is acidified with hydrochloric acid and then extracted with ether. The ether is evaporated off and the residue, consisting of the succinic acid monoester derivative of allo-pregnanol-$20\alpha$-one-3, is hydrolyzed with potassium hydroxide solution. The hydrolyzed solution is extracted with ether, the ether evaporated from the ether extract and the allo-pregnanol-$20\alpha$-one-3 thereby obtained is dissolved up and crystallized from acetone, methyl alcohol and ethyl alcohol to give pure allo-pregnanol-$20\alpha$-one-3 melting at 128° C.

Anal. calcd. for $C_{21}H_{34}O_2$: C, 79.2; H, 10.8. Found: C, 79.7; H, 10.9.

Allo-pregnanol-$20\alpha$-one-3 reacts with semicarbazide to form a semicarbazone which can be separated by the usual methods. The semicarbazone melts with decomposition at 245° C.

Anal. calcd. for $C_{22}H_{37}N_3O_2$: C, 70.3; H, 9.9. Found: C, 69.6; H, 10.1.

The acetate or other carboxylic acid ester of allo-pregnanol-$20\alpha$-one-3, the chloride, and other hydrolyzable derivatives of pregnanol-$20\alpha$-one-3 where the $C_{20}$-hydroxyl is replaced by a group capable of hydrolysis to give a hydroxyl radical, can be made by using any of the ordinary methods for making such derivatives of alcohols. For example, a solution of 100 mg. of allo-pregnanol-$20\alpha$-one-3 in 10 cc. of acetic anhydride is refluxed 30 minutes, the solvent evaporated in vacuo, and the residue crystallized from dilute ethyl alcohol to give small needle-like crystals of allo-pregnanol-$20\alpha$-one-3 acetate melting at 117° C.

Anal. calcd. for $C_{23}H_{36}O_3$: C, 76.8; H, 10.1. Found: C, 77.0; H, 10.2.

Derivatives can also be made from allo-pregnanol-$20\alpha$-one-3 in which the ketonic oxygen at $C_3$ is replaced by an equivalent grouping capable of hydrolysis to ketonic oxygen similar to what is described for the compound of Example 1 above.

The above examples are merely given to illustrate the invention. The examples show partial saponification of a di-ester derivative of a pregnandiol to convert the latter into a mono-ester, that is, a derivative having a free hydroxyl group at $C_3$ and a hydrolyzable and oxidation-resistant group at $C_{20}$. However, the invention is not limited to any particular method of obtaining the compound to be oxidized to a 3-keto derivative. In obtaining the compounds of the invention, one may oxidize any pregnandiol derivative, having an oxidation-resistant group at $C_{20}$ capable of hydrolysis to give a hydroxyl group, and having the following general formula,

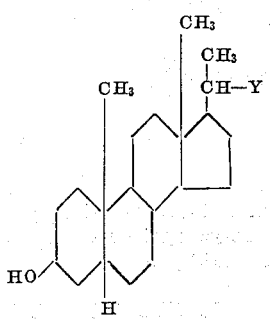

where Y is the oxidation-resistant hydrolyzable group and where the $C_5$ hydrogen atom and Y are present in the compound in the cis-steric arrangement. For instance, in Example 1 instead of oxidizing pregnandiol-3β,20β-monacetate-20, any other monoester of this compound or its $C_{20}$-substituted derivative having at $C_{20}$ an equivalent group, such as a halogen, an ether grouping, etc., capable of being hydrolyzed to a hydroxyl radical, can be used to obtain the same product. The compounds obtained upon oxidizing the pregnane derivatives having a free hydroxyl at $C_3$ in accordance with the invention have the formula,

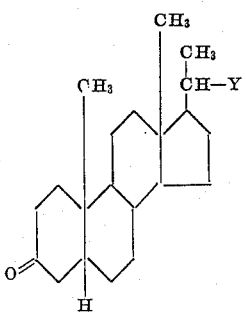

in the case of the normal pregnane derivatives, and the formula,

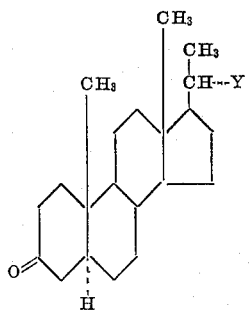

in the case of the allo-pregnane derivatives. It should be noted that when referring to pregnane compounds or pregnanol-20-one-3 compounds in a general sense in the specification and claims, compounds are included which have either a cis- or a trans-connection between rings A and B.

The subject matter disclosed herein relating to the allo series is claimed in the copending application of Marker, Jones & Oakwood, Serial No. 238,060, filed October 31, 1938.

What I claim as my invention is:

1. Pregnane compounds of the formula,

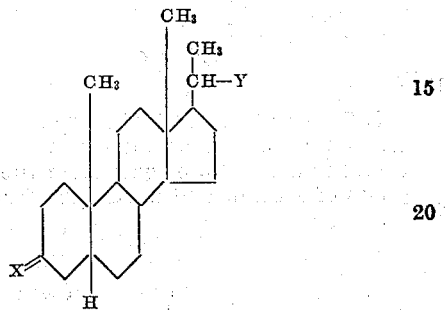

where X is a member of the group, ketonic oxygen and equivalent hydrolyzable groupings capable of yielding a ketonic oxygen atom upon hydrolysis, Y is a member of the group, a hydroxyl radical and an equivalent hydrolyzable group capable of yielding a hydroxyl group upon hydrolysis, and in which the $C_5$ hydrogen atom and Y are present in the cis-steric arrangement.

2. A pregnanol-20β-one-3 type of compound of the formula,

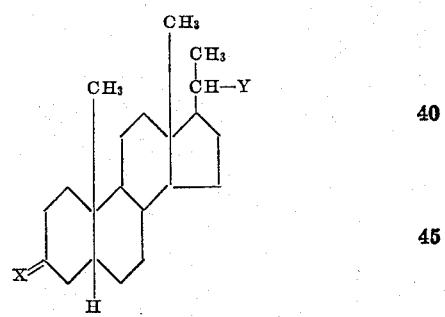

where X is a member of the group ketonic oxygen and equivalent hydrolyzable groupings capable of yielding a ketonic oxygen atom upon hydrolysis and Y is a member of the group, a hydroxyl radical and an equivalent hydrolyzable group capable of yielding a hydroxyl group upon hydrolysis.

3. A pregnanol-20β-one-3 type of compound of the formula,

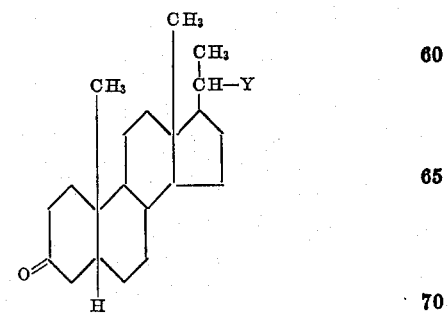

where Y is a member of the group, a hydroxyl radical and an equivalent hydrolyzable group capable of yielding a hydroxyl group upon hydrolysis.

4. Pregnanol-20β-one-3 having the following formula:

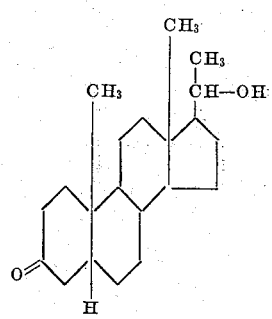

5. The process of obtaining a pregnanol-20β-one-3 type of compound which comprises oxidizing to a ketonic oxygen atom the 3-hydroxyl group of a compound having the formula,

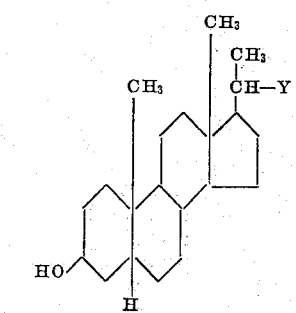

where Y is an oxidation-resisting hydrolyzable group.

6. The process for obtaining pregnanol-20β-one-3 which comprises oxidizing to a ketonic oxygen atom the 3-hydroxyl group of a compound having the formula,

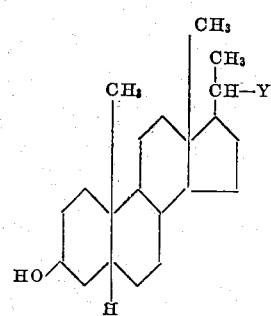

where Y is an oxidation-resisting hydrolyzable group, and hydrolyzing the resulting 3-keto compound to obtain said pregnanol-20β-one-3.

RUSSELL EARL MARKER.